United States Patent [19]
Klaus et al.

[11] 4,082,380
[45] Apr. 4, 1978

[54] AXIAL THRUST SLIDING BEARING FOR CENTRIFUGAL PUMPS AND COMPRESSORS

[75] Inventors: Franz Klaus, Uhlandstrasse 54, 4630 Bochum, Germany; Franz Johann Potrykus, Bochum, Germany

[73] Assignee: said Franz Klaus, by said Franz Johann Potrykus, Bochum, Germany

[21] Appl. No.: 719,830

[22] Filed: Sep. 2, 1976

[30] Foreign Application Priority Data

Sep. 4, 1975   Germany .............................. 2539425

[51] Int. Cl.² .............................................. F16C 17/04
[52] U.S. Cl. ...................................... 308/163; 308/160
[58] Field of Search .................. 308/3 R, 3.6, 36, 37, 308/161, 162, 172, 175, 160, 163

[56] References Cited

U.S. PATENT DOCUMENTS

| | | | |
|---|---|---|---|
| 2,708,610 | 5/1955 | Donaldson et al. | 308/162 |
| 2,996,340 | 8/1961 | Macks | 308/163 |
| 3,761,151 | 9/1973 | Kerr | 308/160 |
| 3,966,279 | 6/1976 | Raimondi | 308/160 |
| 3,971,602 | 7/1976 | Anderson | 308/163 |

Primary Examiner—Richard A. Bertsch

[57] ABSTRACT

An axial thrust sliding bearing is provided for a shaft-driven centrifugal fluid handling machine which provides non-contact accommodation of axial thrust loads, self-pressurized lubrication, and improved wear resistance. A shaft is journaled within a stationary bearing support sleeve and has an opposed bearing ring disc secured to the shaft for rotation therewith. The sleeve and the disc each have spaced apart, facing front end surfaces angled with respct to the axial center line of the shaft so that during rotation of the shaft and of the bearing ring disc secured thereto, the front end surface of the bearing ring disc is moved toward and away from a fixed point on the front end surface of the stationary bearing support sleeve, thereby providing a pumping action on a lubricating fluid contained between the two surfaces.

6 Claims, 1 Drawing Figure

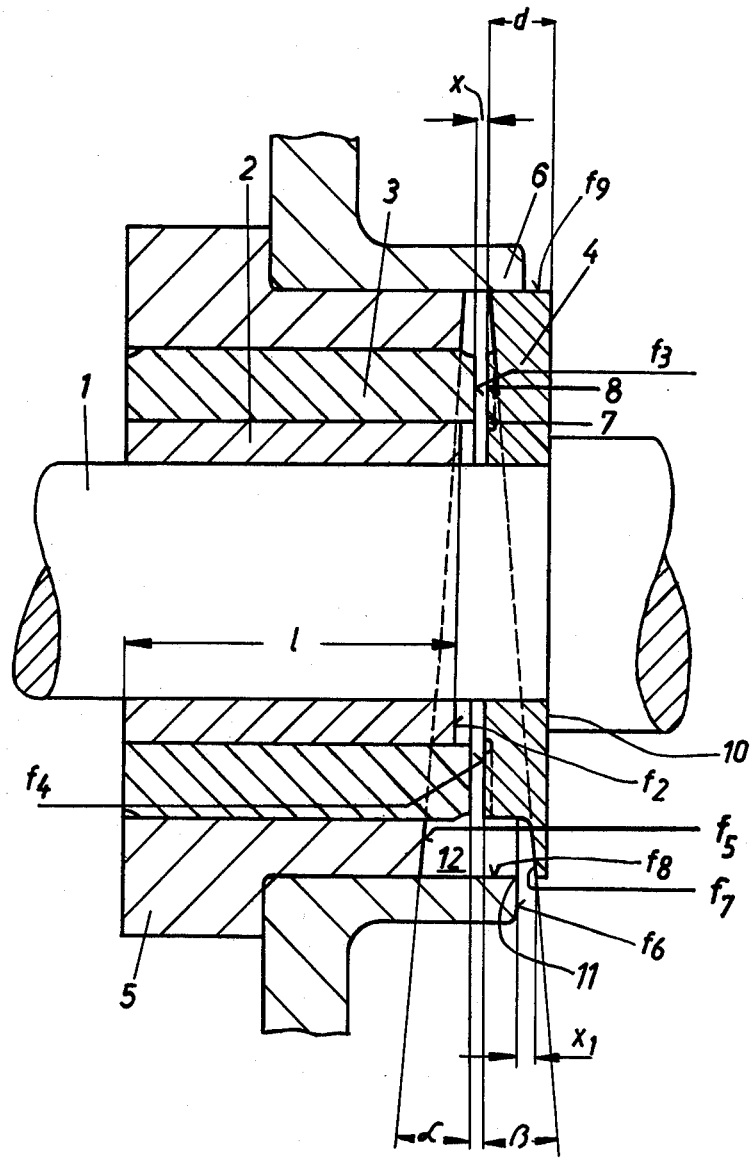

AXIAL THRUST SLIDING BEARING FOR CENTRIFUGAL PUMPS AND COMPRESSORS

This invention relates to an axial thrust sliding bearing for use in rotating fluid handling machines, such as compressors and centrifugal pumps, in particular, magnetically driven, glandless gap-tube pumps.

BACKGROUND OF THE INVENTION

In the design and construction of fluid handling machines of the centrifugal type, especially glandless gap-tube pumps and compressors in which a shaft axial bearing operates in a bath or supply of lubricant (including, in particular, the pumped fluid), a problem is presented by the axial thrust forces, often of considerable magnitude, which are exerted upon the bearing by the impeller or impellers acting through the shaft.

In the past, various bearing designs have been introduced to provide proper accommodation of the high axial thrust forces. Many of those designs that are relatively simple have been found to be susceptible to excessive wear. Other designs are disadvantageously more elaborate and expensive. Further, with many of these designs, proper lubrication is critical, and this requires additionally complex lubrication systems.

SUMMARY OF THE INVENTION

This invention provides an axial thrust bearing of simple design for contactless accommodation of axial thrusts in pumps, compressors, and the like. The axial thrust sliding bearing of this invention is designed to run in a bath of lubricant with perfect lubrication under various operating conditions and therefore with limited wear.

As will be explained below, the axial thrust bearing of this invention can be used with an inner rotor comprising the impeller of a centrifugal pump of the gap-tube type which is lubricated by the pumped fluid. The invention provides a unique modification and improvement of a conventional axial thrust sliding bearing, especially such as used with gap-tube centrifugal pumps between the centrifugal impeller and the inner rotor on the impeller drive means, or shaft, which is contained in a separation means, or a gap-tube, to afford glandless sealing with respect to an outer rotor. Specifically, an inner bearing sleeve is secured to the shaft for rotation therewith along with a bearing ring disc which is secured on the pump shaft for rotation therewith and which has a radially extending thrust bearing surface. This bearing ring bears, by way of the bearing surface, against the radially extending front end thrust bearing surface of an annular bearing bushing slidably contacting the inner bearing sleeve and retained in the bearing support sleeve. The bearing support sleeve is held by a bearing flange of the housing of the pump or compressor, and is secured thereto against rotation. The flange projects beyond the front end bearing surface of the bearing bushing.

According to the present invention in the combination of parts described, a small distance, which is greater than the usual bearing clearance common to conventional machines of this type, is provided between the radial thrust bearing surfaces to accommodate non-contact take-up of axial thrust. Another feature of the invention is that the front end surface of the bearing support sleeve is formed to extend at a small angle obliquely with respect to the thrust bearing surfaces.

Another feature is that the front end surface of the bearing ring disc, which is disposed axially opposite the front end surface of the bearing support sleeve and radially outside of the thrust bearing surfaces and which extends almost out to the inner surface of the bearing flange, is likewise formed to extend at a small angle obliquely with respect to the thrust bearing surfaces. The angle of inclination suitably lies between 3° and 10°, and is preferably about 5°. Still another feature is that the outer front end surface of the bearing ring disc extends partly axially beyond the front end surface or inner edge of the cylindrical inner surface of the bearing flange or other support means for the support sleeve.

It is not necessary that the bearing bushing, which can be made from metal or carbon in metal pumps and can be made from plastic in all-plastic pumps, be provided separately from the bearing support sleeve. Instead, a single bearing member may be used which is then structurally divided into an outer and an inner zone, the radially outer zone having the inclined front end surface and the radially inner zone comprising the front end thrust bearing surface. Further, though the bearing bushing could be in direct contact with the shaft, it is preferable that the bearing bushing is not in direct engagement with the shaft and rather is supported radially by a bearing sleeve fixed on the shaft.

By virtue of the design according to the present invention of the axial thrust sliding bearing, a pumping action is generated within the outwardly open lubricant pump chamber substantially defined between the front end surface of the bearing support sleeve and the axially oppositely located outer front end surface of the bearing ring disc and the inner cylindrical surface or wall of the bearing flange. This pumping action is exerted on the lubricant provided from outside of the bearing assembly.

With gap-tube pumps, for example, the pumped liquid can be used as the lubricant. The pumping action is caused by the fact that the oblique front end surface of the bearing ring disc rotates with respect to the stationary front end surface of the bearing support sleeve. During shaft rotation, the gap between the oblique front end surface of the bearing ring disc and the oblique front end surface of the bearing support sleeve (and between the opening between the inner edge of the bearing flange and the outer edge of the bearing ring disc) increases and decreases, whereby the lubricant is pressurized in the gap. As the gap between the outer oblique front end surface of the bearing ring disc and the front end surface of the bearing flange gradually becomes smaller upon rotation, the pressure rises correspondingly and thus prevents contact between the thrust bearing surfaces of the bearing bushing and the bearing ring disc, even under high axial thrust loads.

To improve conveyance of the lubricant toward the inner zone of the thrust bearing surfaces, a novel feature is provided which comprises an annular groove formed in the thrust bearing surface of the bearing ring disc in the area of the inner diameter of the opposing thrust bearing surfaces. This annular groove communicates through radial lubricating grooves with the lubricant pump chamber substantially defined by the front end surfaces of the bearing support sleeve and the bearing ring disc and the inner wall of the bearing flange.

In further development of the axial thrust sliding bearing according to this invention, the outer diameter of the bearing ring disc is smaller than the cylindrical inner diameter or wall of the bearing flange by the maximum permissible extent of radial wear of the bearing bushing. Thus it is possible to predetermine and limit the wear of the bearing bushing, a carbon bushing for example, by predetermining the tolerance between outer diameter of the bearing ring disc and inner diameter of the bearing flange.

The invention affords a similar advantage with respect to the axial wear if the front end of the bearing bushing protrudes beyond the radial plane of both (1) the bearing support sleeve and (2) the bearing sleeve on the shaft, by the maximum permissible axial wear. Then, if the bearing bushing becomes almost completely worn at its front end, the oblique front end surface of the bearing ring disc abuts the oblique front end surface of the bearing support sleeve at only small areas of circumferential contact, i.e., in the areas extending farthest in axial direction.

Numerous other advantages and features of the present invention will become readily apparent from the following detailed description of the invention and of one embodiment thereof from the claims, and from the accompanying drawings.

BRIEF DESCRIPTION OF THE DRAWING

The drawing is a cross-sectional view of a thrust sliding bearing according to the present invention and forms a part of the specification.

DESCRIPTION OF THE PREFERRED EMBODIMENT

While this invention is susceptible of embodiment in many different forms, there is shown in the drawing and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

The invention will be described further, by way of example, with reference to the accompanying drawing which illustrates an axial thrust sliding bearing rotating within a surrounding lubricant in accordance with the present invention.

A stepped pump shaft 1, having an impeller on one end (not shown), is formed with a shoulder 10. In the area of the axial bearing length $l$, bearing sleeve 2 is secured for rotation with said shaft 1. Such a shaft and bearing sleeve assembly can be used in a magnetically-driven centrifugal glandless gap-tube pump such as that disclosed in commonly assigned Klaus application entitled "Permanent Magnetic Centrifugal Pump" filed Aug. 2, 1976. In the Klaus application, bearing ring 6 (with bearing surface 22) corresponds to bearing sleeve 2 of the present invention, and could be modified in accordance with the improvement of the present invention which is hereinafter described.

A bearing ring disc 4, being spaced from the radial front end surface $f_2$ of the inner bearing sleeve 2 and disposed abutting the radial shoulder 10, is likewise secured for rotation with said shaft. A stationary bearing support flange 6 retains an outer bearing support sleeve 5 for supporting a bearing bushing 3 surrounding and slidingly engaging the bearing sleeve 2. The bearing bushing 3 may be made of carbon, or other suitable material.

The front end of the bearing bushing 3 extends by the maximum permissible wear length of the bearing bushing 3 beyond the front end surface $f_2$ of the bearing sleeve 2 and the front end surface $f_5$ of the bearing support sleeve 5. The thrust bearing surface $f_4$ of the bearing ring disc 4 is located axially opposite the front end thrust bearing surface $f_3$ of bearing bushing 3 at a small distance $x$. The front end of the bearing flange 6 extends axially beyond the front end surface $f_5$ of bearing support sleeve 5 and bearing bushing by more than the extent of spacing $x$ but less than the sum of spacing $x$ plus the thickness $d$ of bearing ring disc 4.

The radial front end surface $f_5$ of bearing support sleeve 5 is formed obliquely with respect to the thrust bearing surfaces $f_3$ and $f_4$ and extends at a small angle $\alpha$ of, for example, 5°. Bearing ring disc 4 has an outer front end surface $f_7$ disposed axially opposite the front end surface $f_5$ and radially beyond the thrust bearing surface $f_4$ and which is likewise oblique with respect to the thrust bearing surfaces, extending at a small angle $\beta$ of, for example, 5°. At the same time, the inclination of the outer oblique front end surface $f_7$ of bearing ring disc 4, the thickness $d$ of the bearing ring disc 4, and the axial projection of bearing flange 6 beyond front end thrust bearing surface $f_4$ are so chosen that a distance $x_1$ remains between the inner front end edge 11 of bearing flange 6 and a part of front end edge of front end surface $f_7$ of bearing ring disc 4. Consequently front end surface $f_7$ partly extends axially beyond the front end surface $f_6$ of bearing flange 6.

An annular lubricant pumping space or chamber 12 is defined substantially by the stationary bearing bushing 3, bearing support sleeve 5, and bearing flange 6, and by the rotating bearing ring disc 4, as may be seen from the drawing. It is characterized by an oblique plane extending into the outer diameter of bearing bushing 3. As bearing ring disc 4 rotates relative to bearing support sleeve 5, a pumping action is effected in the outwardly open lubricant pump chamber 12. Opposite the front end thrust bearing surface $f_3$, the bearing ring disc 4 is provided with radial lubricating grooves 8 which preferably connect with an annular groove 7 in the radially inner zone of thrust bearing surface $f_4$ of bearing ring disc 4. The pumping action prevents contact between thrust bearing surfaces $f_3$ and $f_4$ and permits a nearly frictionless relative rotation therebetween, the bearing surfaces $f_3$ and $f_4$ being maintained apart by the pressurized lubricant.

Even if bearing bushing 3 is almost completely worn at its front end bearing surface $f_3$, bearing ring disc 4 will move into contact with bearing support sleeve 5 only at minor areas between surfaces $f_5$ and $f_7$. Thus it is possible to control the permissible axial wear of the thrust bearing from the very beginning. The same possibility exists with respect to the radial wear of bearing bushing 3 in that the tolerance between the outer circumferential surface $f_9$ of bearing ring disc 4 and the diameter of the inner wall or cylindrical surface $f_8$ of bearing flange 6 is made equal to the permissible radial wear. After wear the bearing ring disc 4 will abut either the bearing support sleeve 5 and/or the bearing flange 6 causing excessive noticeable friction and requiring an increased power input, thus signaling that the bearing bushing should be replaced.

In the case of glandless pumps, it is seen that damage resulting from the lack of direct of visual monitoring of the bearing wear are thus avoidable by measuring the electrical power requirement of the pump motor (assuming, of course, that the motor drives the impeller rotor which is journaled by means of the thrust bearing in accordance with the invention). More specifically, the current rises in response to increased power needed to overcome the additional resistance when the rotating axial surface and/or the oblique radial surface begin to contact the opposite stationary surfaces. The pump can be automatically controlled to shut down when a predetermined current is reached, thus allowing the bearing bushing to be replaced by a new one before any damage occurs.

It may be convenient to arrange a cooling or heating coil or similar means within the lubricant pump chamber so as to effect lubrication of the bearing at any desired temperature.

From the foregoing, it will be observed that numerous variations and modifications may be effected without departing from the true spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

What is claimed is:

1. In an axial thrust sliding bearing for a shaft-driven centrifugal fluid handling machine having an exterior housing, said sliding bearing having
    a bearing flange carried by the exterior housing of said fluid handling machine;
    a bearing support sleeve secured to said bearing flange;
    a bearing bushing retained in said bearing support sleeve and secured therein against rotation, said bearing bushing having a first, radial front end thrust bearing surface; and
    a bearing ring disc secured to said shaft for rotation therewith and having a second, radial thrust bearing surface for bearing against said first, radial front end thrust bearing surface, said bearing flange projecting beyond said first and second thrust bearing surfaces;
    the improvement comprising the facts that;
    (a) said bearing flange has an inner surface adjacent said bearing support sleeve and a portion of said bearing ring disc;
    (b) said bearing bushing and said bearing ring disc are located relative to each other with a space between said first and second thrust bearing surfaces to provide non-contact accommodation of axial thrust when a pressurized fluid is introduced therein;
    (c) said bearing support sleeve has a front end surface extending at a small angle obliquely with respect to said first and second thrust bearing surfaces; and
    (d) said bearing ring disc has an axially opposite front end surface disposed outside of said second, radial thrust bearing surface, said axially opposite front end surface extending radially outwardly toward said inner surface of said bearing flange and extending at a small angle obliquely with respect to said first and second thrust bearing surfaces, said axially opposite front end surface being spaced axially beyond and away from the front end surface of the bearing flange for a portion of their circumference.

2. An axial thrust sliding bearing as claimed in claim 1, wherein the angle of inclination of the oblique front end surfaces is from about 3° to about 10°.

3. An axial thrust sliding bearing as claimed in claim 1, wherein the angle of inclination of the oblique front end surface is about 5°.

4. The improvement in accordance with claim 1, including an outwardly open lubricating fluid pump chamber, a portion of said chamber being defined by (a) said front end surface of said bearing sleeve, (b) said axially opposite front end surface of said bearing ring disc and other portions thereof, and (c) said inner surface of said bearing flange; and wherein said second, radial thrust bearing surface has an annular groove in the area opposite the inner diameter of said first, front end thrust bearing surface and further has radial lubricating grooves providing communication between said groove and said chamber.

5. The improvement in accordance with claim 1, wherein the outer diameter of said bearing ring disc is smaller than the inner diameter of the bearing flange by a predetermined maximum permissible amount of radial wear of said bearing bushing.

6. The improvement in accordance with claim 1, including a bearing sleeve secured to said shaft between said shaft and said bearing bushing and wherein said bearing bushing extends axially beyond said bearing support sleeve and said bearing sleeve by a predetermined permissible amount of axial wear of said bearing bushing.

* * * * *